(12) United States Patent
Lee et al.

(10) Patent No.: US 8,519,908 B2
(45) Date of Patent: Aug. 27, 2013

(54) IMAGE DISPLAY DEVICE

(75) Inventors: Donghoon Lee, Goyang-si (KR);
Kwangjo Hwang, Anyang-si (KR);
Jinyeong Kim, Paju-si (KR); Heeyoung Chae, Paju-si (KR); Seok Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 378 days.

(21) Appl. No.: 12/969,025

(22) Filed: Dec. 15, 2010

(65) Prior Publication Data
US 2011/0227886 A1    Sep. 22, 2011

(30) Foreign Application Priority Data

Mar. 17, 2010  (KR) .................. 10-2010-0023888
Jun. 10, 2010  (KR) .................. 10-2010-0054678

(51) Int. Cl.
*G09G 5/00*     (2006.01)
(52) U.S. Cl.
USPC ......... 345/6; 348/42; 348/60; 349/15; 349/49
(58) Field of Classification Search
USPC .............. 345/6, 89, 92, 204, 212, 419, 690, 345/694, 87; 349/15, 38, 39, 49, 65, 95; 348/42, 60
See application file for complete search history.

(56) References Cited

U.S. PATENT DOCUMENTS

| | | | | |
|---|---|---|---|---|
| 8,223,282 B2 * | 7/2012 | You et al. | ......................... | 349/38 |
| 2009/0207115 A1 * | 8/2009 | Kim | ............................... | 345/90 |
| 2010/0265230 A1 * | 10/2010 | Kang | ............................ | 345/211 |
| 2010/0302634 A1 * | 12/2010 | Jung | ............................ | 359/465 |

* cited by examiner

*Primary Examiner* — Kevin M Nguyen
*Assistant Examiner* — Jennifer Nguyen
(74) *Attorney, Agent, or Firm* — Birch, Stewart, Kolasch & Birch, LLP

(57) ABSTRACT

An image display device includes a display panel that includes a plurality of subpixels and selectively displays the 2D image and the 3D image, and a patterned retarder that is positioned in front of the display panel and divides light from the display panel into light of a first polarization and light of a second polarization when the 3D image is displayed. Each subpixel includes a main subpixel including a first pixel electrode receiving a data voltage through a data line and a common electrode receiving a common voltage through a common line, and a subsidiary subpixel including a second pixel electrode receiving the data voltage through the data line, a common electrode positioned opposite the second pixel electrode, and a discharge thin film transistor (TFT) selectively connecting the second pixel electrode to the common electrode based on a displayed image.

20 Claims, 17 Drawing Sheets

(a)

(b)

IMAGE DISPLAY DEVICE

This application claims the benefit of Korea Patent Application No. 10-2010-0023888 filed on Mar. 17, 2010, and Korea Patent Application No. 10-2010-0054678 filed on Jun. 10, 2010, which are incorporated herein by reference for all purposes as if fully set forth herein.

BACKGROUND OF THE INVENTION

1. Field of the Invention

Embodiments of the invention relate to an image display device for displaying a two-dimensional plane image (hereinafter referred to as '2D image') and a three-dimensional stereoscopic image (hereinafter referred to as '3D image').

2. Discussion of the Related Art

An image display device displays a 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the glasses type method, the parallax image between the left and right eyes is displayed on a direct-view display or a projector through a change in a polarization direction of the left and right parallax image or in a time-division manner, and thus a stereoscopic image is implemented using polarization glasses or liquid crystal shutter glasses. In the non-glasses type method, an optical plate such as a parallax barrier for separating an optical axis of the parallax image between the left and right eyes is generally installed in front of or behind a display screen.

As shown in FIG. 1, the image display device using the glasses type method may include a patterned retarder 5 for converting polarization characteristics of light incident on polarization glasses 6 on a display panel 3. In the glasses type method, a left eye image (L) and a right eye image (R) are alternately displayed on the display panel 3, and the polarization characteristics of light incident on the polarization glasses 6 are converted by the patterned retarder 5. Through this operation, the glasses type method implements a 3D image by spatially dividing the left eye image (L) and the right eye image (R). In FIG. 1, a reference numeral 1 denotes a backlight unit providing light to the display panel 3, and reference numerals 2 and 4 denote polarizing plates respectively attached on upper and lower surfaces of the display panel 3 so as to select a linear polarization.

In the glasses type method, visibility of the 3D image is degraded due to crosstalk generated at the position of an upward or downward viewing angle. As a result, in the general glasses type method, the upward/downward viewing angle capable of allowing the user to view the 3D image of the good image quality is very narrow. The crosstalk is generated because the left eye image (L) passes through a right eye patterned retarder region as well as a left eye patterned retarder region and the right eye image (R) passes through the left eye patterned retarder region as well as the right eye patterned retarder region at the position of the upward/downward viewing angle. Thus, as shown in FIG. 2, Japanese Laid Open Publication No. 2002-185983 discloses a method for obtaining a wider upward/downward viewing angle by forming black stripes (BS) in patterned retarder regions corresponding to black matrixes (BM) of a display panel to thereby improve the visibility of the 3D image. In FIG. 2, when observing at a predetermined distance (D), a viewing angle ($\alpha$), at which the crosstalk is not theoretically generated, depends on the size of black matrixes (BM) of the display panel, the size of black stripes (BS) of the patterned retarder, and a spacer (S) between the display panel and the patterned retarder. The viewing angle ($\alpha$) widens as the size of the black matrixes and the size of the black stripes increase and as the spacer (S) between the display panel and the patterned retarder decreases.

However, the related art image display device has the following problems.

First, the black stripes of the patterned retarder used to improve the visibility of the 3D image through the improvement of the viewing angle interact with the black matrixes of the display panel, thereby generating moiré. When a 2D image is displayed, the visibility of the 2D image is much degraded. FIG. 3 shows the results obtained by observing a 47-inch display device sample at a location 4 meters away from the display device to which the black stripes are applied. When the 2D image is displayed, moirés of 90 mm, 150 mm, and 355 mm are visible based on observation positions A, B, and C, respectively.

Second, the black stripes used to improve the visibility of the 3D image through the improvement of the viewing angle bring about a side effect allowing a luminance of the 2D image to be drastically degraded. This is because, as shown in FIG. 4(b), in the related art, predetermined portions of pixels of the display panel are covered by the black stripe patterns. Accordingly, when the 2D image is displayed, an amount of transmitted light is reduced by about 30% compared with the case where the black strips are not formed as shown in FIG. 4(a).

SUMMARY OF THE INVENTION

Exemplary embodiments of the invention provide an image display device capable of improving visibility of both a 2D image and a 3D image and preventing a reduction in luminance in displaying a 2D image.

In one aspect, there is an image display device comprising a display panel including a plurality of red, green, and blue subpixels, the display panel configured to selectively display a 2D image and a 3D image, and a patterned retarder positioned in front of the display panel, the patterned retarder configured to divide light from the display panel into light of a first polarization and light of a second polarization when the 3D image is displayed, wherein each of the plurality of red, green, and blue subpixels includes a main subpixel including a first pixel electrode receiving a data voltage through a data line and a common electrode that is positioned opposite the first pixel electrode and receives a common voltage through a common line, and a subsidiary subpixel including a second pixel electrode receiving the data voltage through the data line, a common electrode positioned opposite the second pixel electrode, and a discharge thin film transistor (TFT) selectively connecting the second pixel electrode to the common electrode based on a displayed image.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
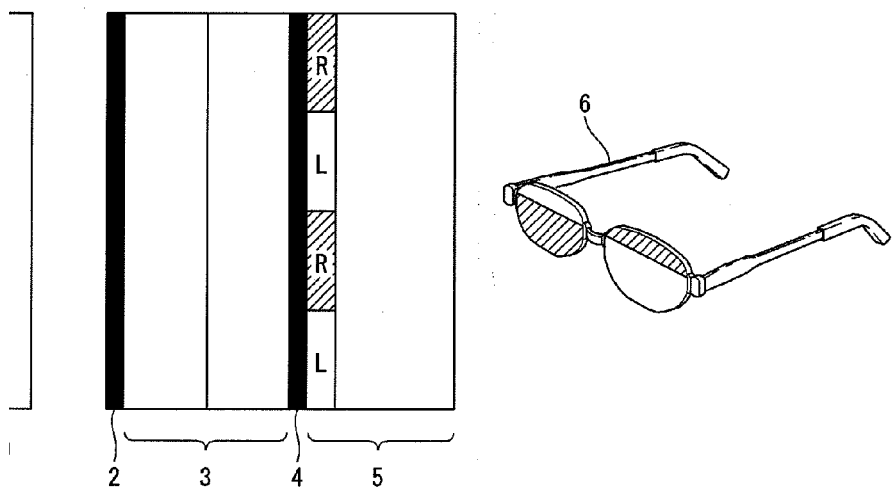
FIG. 1 schematically illustrates a glasses type image display device.
Figure 2:
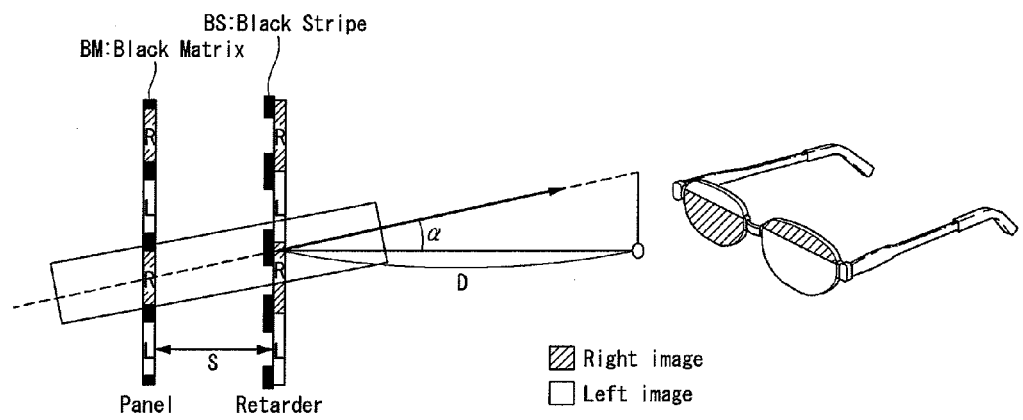
FIG. 2 illustrates an image display device having related art black stripe patterns.
Figure 3:
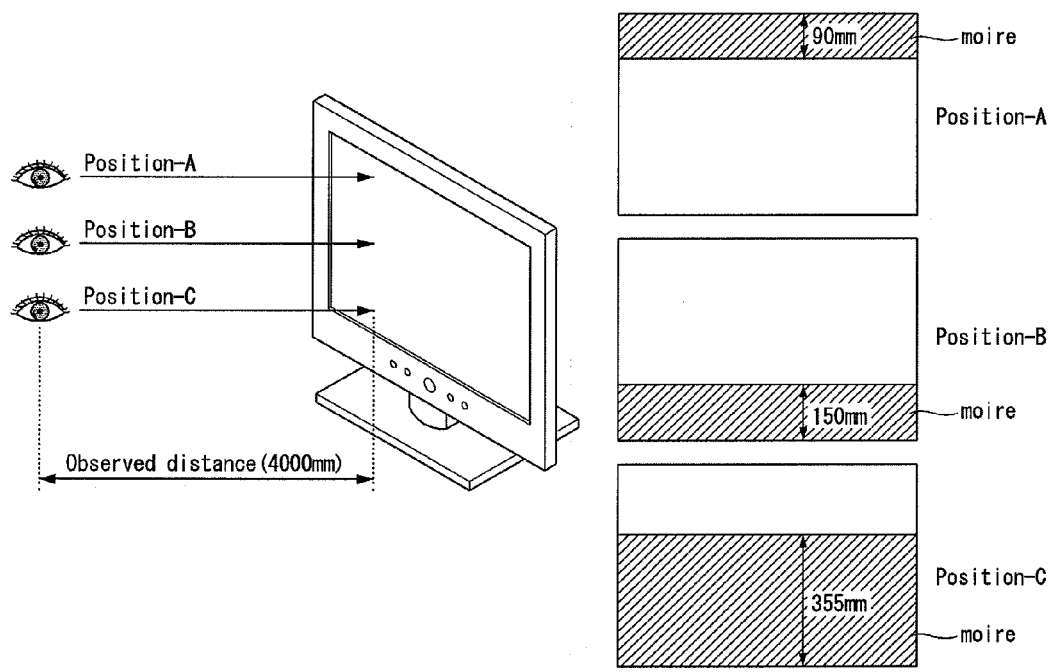
FIG. 3 illustrates moiré generated by black stripe patterns in the related art image display device.
Figure 4:
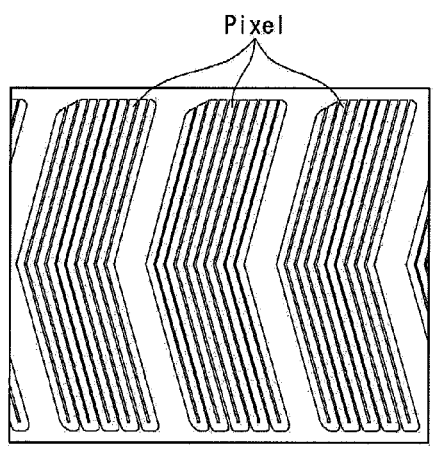
FIG. 4 illustrates a reduction in an amount of transmitted light due to a black strip pattern in the related art image display device.
Figure 4:
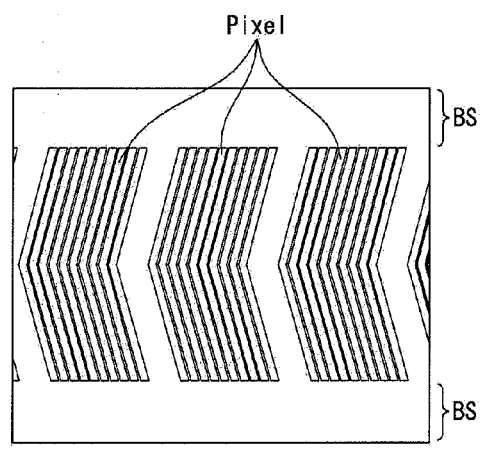
Figure 5:
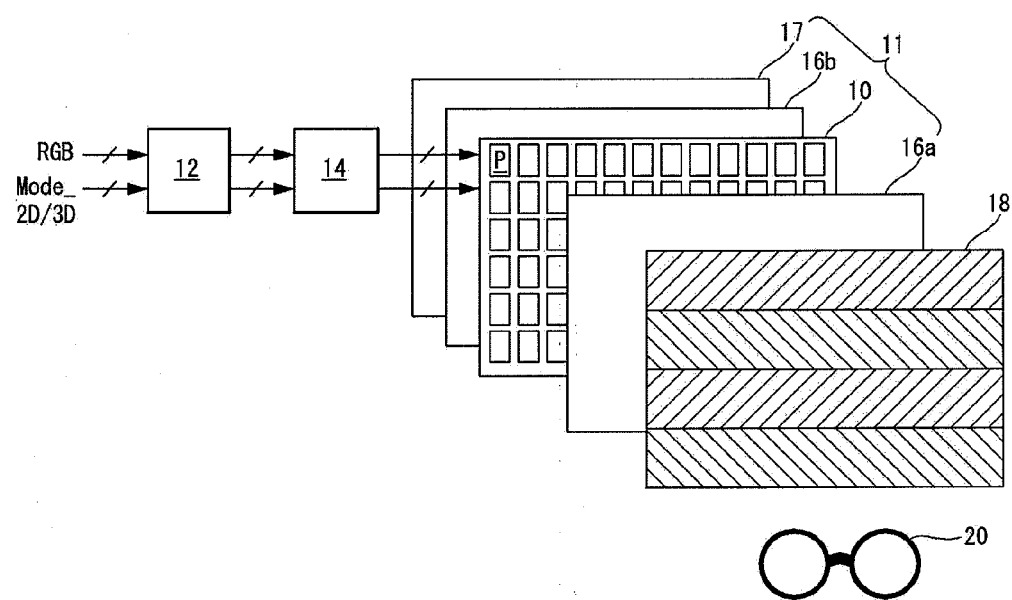
FIG. 5 is a block diagram of an image display device according to an exemplary embodiment of the invention.
Figure 6:
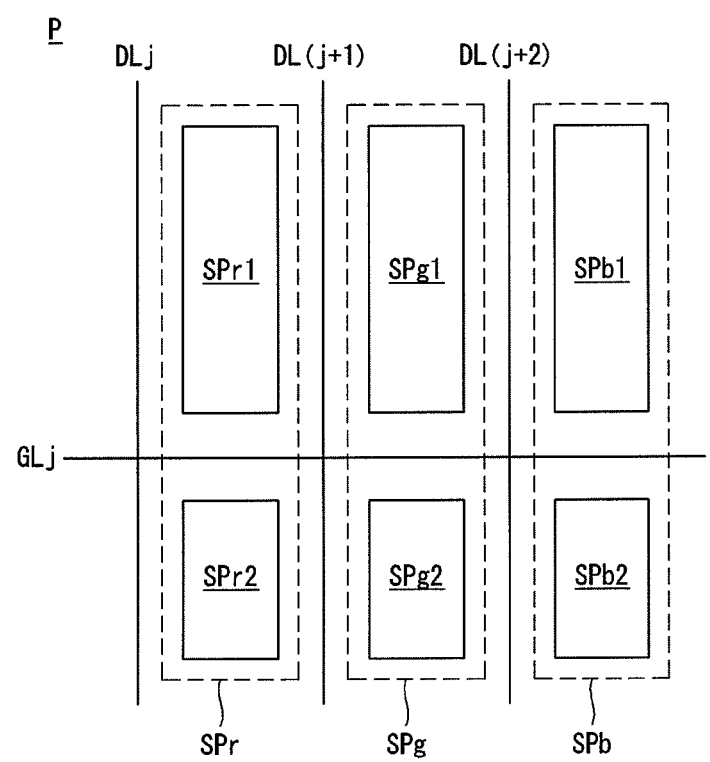
FIG. 6 illustrates a structure of a unit pixel.

FIG. 5 is a block diagram of an image display device according to an exemplary embodiment of the invention. FIG. 6 illustrates a structure of a unit pixel of the image display device.

As shown in FIG. 5, an image display device according to an exemplary embodiment of the invention includes a display element 11, a controller 12, a panel driving circuit 14, a patterned retarder 18, and polarization glasses 20. The patterned retarder 18 and the polarization glasses 20 serve as a 3D driving element and implement a binocular disparity by spatially separating a left eye image and a right eye image.

The display element 11 may be implemented as a liquid crystal display element. The liquid crystal display element includes a liquid crystal display panel 10, a backlight unit 17 positioned under the liquid crystal display panel 10, an upper polarizing film 16a positioned between the liquid crystal display panel 10 and the patterned retarder 18, and a lower polarizing film 16b positioned between the liquid crystal display panel 10 and the backlight unit 17.

The liquid crystal display panel 10 includes an upper glass substrate, a lower glass substrate, and a liquid crystal layer interposed between the upper and lower glass substrates. A thin film transistor (TFT) array is formed on the lower glass substrate. The TFT array includes a plurality of data lines to which R (red), G (green), and B (blue) data voltages are supplied, a plurality of gate lines (or scan lines) that cross the data lines and receive a gate pulse (or scan pulse), a plurality of TFTs formed at crossings of the data lines and the gate lines, a plurality of pixel electrodes for charging liquid crystal cells to the data voltages, a storage capacitor that is connected to each pixel electrode and holds the voltage of the liquid crystal cells, and the like. A color filter array is formed on the upper glass substrate. The color filter array includes black matrixes, color filters, and the like. A common electrode that is positioned opposite the pixel electrode and forms an electric field along with the pixel electrode is formed on the upper glass substrate in a vertical electric field driving method such as a twisted nematic (TN) mode and a vertical alignment (VA) mode. The common electrode may be formed on the lower glass substrate along with the pixel electrode in a horizontal electric field driving method such as an in-plane switching (IPS) mode or a fringe field switching (FFS) mode. The liquid crystal cells are driven in a normally black mode in which a transmittance or a gray level increases as a difference between the data voltage and a common voltage supplied to the common electrode increases. The upper polarizing film 16a is attached to the upper glass substrate, and the lower polarizing film 16b is attached to the lower glass substrate. Alignment layers for setting a pre-tilt angle of liquid crystals are respectively formed on the inner surfaces contacting the liquid crystals in the upper and lower glass substrates. A column spacer may be formed between the upper and lower glass substrates to keep cell gaps of the liquid crystal cells constant.

As shown in FIG. 6, a unit pixel P formed on the liquid crystal display panel 10 includes an R subpixel SPr, a G subpixel SPg, and a B subpixel SPb. The R subpixel SPr includes an R main subpixel SPr1 and an R subsidiary subpixel SPr2 that are positioned on opposite sides of a gate line GLj. When the gate line GLj is activated, the R main subpixel SPr1 and the R subsidiary subpixel SPr2 are electrically connected to a first data line DLj. The G subpixel SPg includes a G main subpixel SPg1 and a G subsidiary subpixel SPg2 that are positioned on opposite sides of the gate line GLj. When the gate line GLj is activated, the G main subpixel SPg1 and the G subsidiary subpixel SPg2 are electrically connected to a second data line DL(j+1). The B subpixel SPb includes a B main subpixel SPb1 and a B subsidiary subpixel SPb2 that are positioned on opposite sides of the gate line GLj. When the gate line GLj is activated, the B main subpixel SPb1 and the B subsidiary subpixel SPb2 are electrically connected to a third data line DL(j+2). A connection structure and an operation effect of the R, G and B subpixels are described in detail with reference to FIGS. 7 to 15.

The panel driving circuit 14 includes a data driving circuit for driving the data lines of the liquid crystal display panel 10 and a gate driving circuit for driving the gate lines of the liquid crystal display panel 10. The data driving circuit converts RGB digital video data of 2D or 3D data format into an analog gamma voltage under the control of the controller 12 to generate the R, G, and B data voltages. The data driving circuit then supplies the R, G, and B data voltages to the data lines. The gate driving circuit generates the scan pulse under the control of the controller 12 and sequentially activates the gate lines using the scan pulse.

Figure 9:
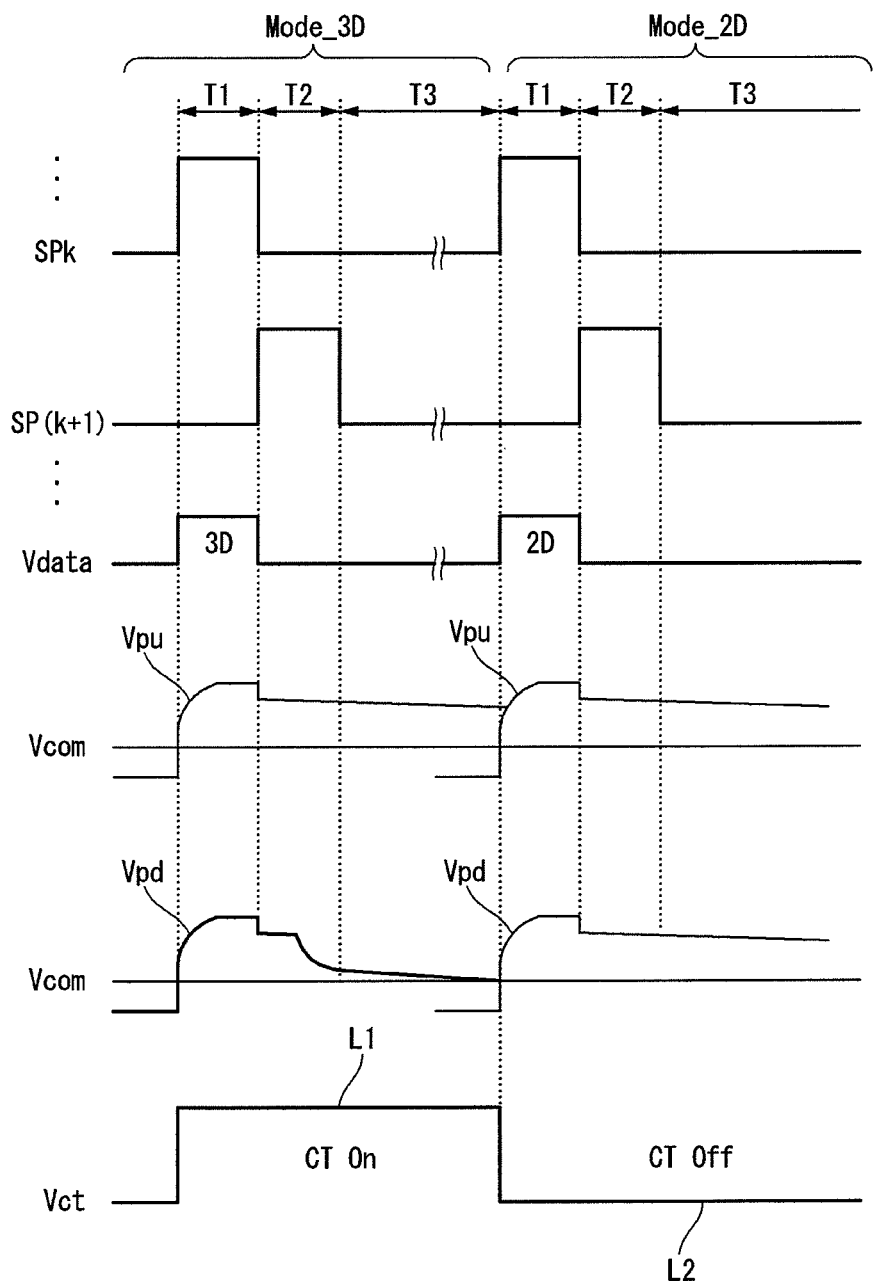
FIG. 9 illustrates a waveform of signals for operating the subpixels shown in FIGS. 7 and 8 and a charging waveform of the subpixels.

The controller 12 controls the panel driving circuit 14 in a 2D mode Mode_2D or a 3D mode Mode_3D in response to a mode selection signal input through a user interface (not shown) or a 2D/3D identification code extracted from an input image signal. As shown in FIG. 9, the controller 12 may vary a level of a control voltage Vct so that a control TFT CT is turned on or off based on the 2D/3D mode. For example, the controller 12 generates the control voltage Vct of a first level L1 in the 3D mode Mode_3D so that the control TFT CT can be turned on. The controller 12 generates the control voltage Vct of a second level L2 in the 2D mode Mode_2D so that the control TFT CT can be turned off.

Figure 12:
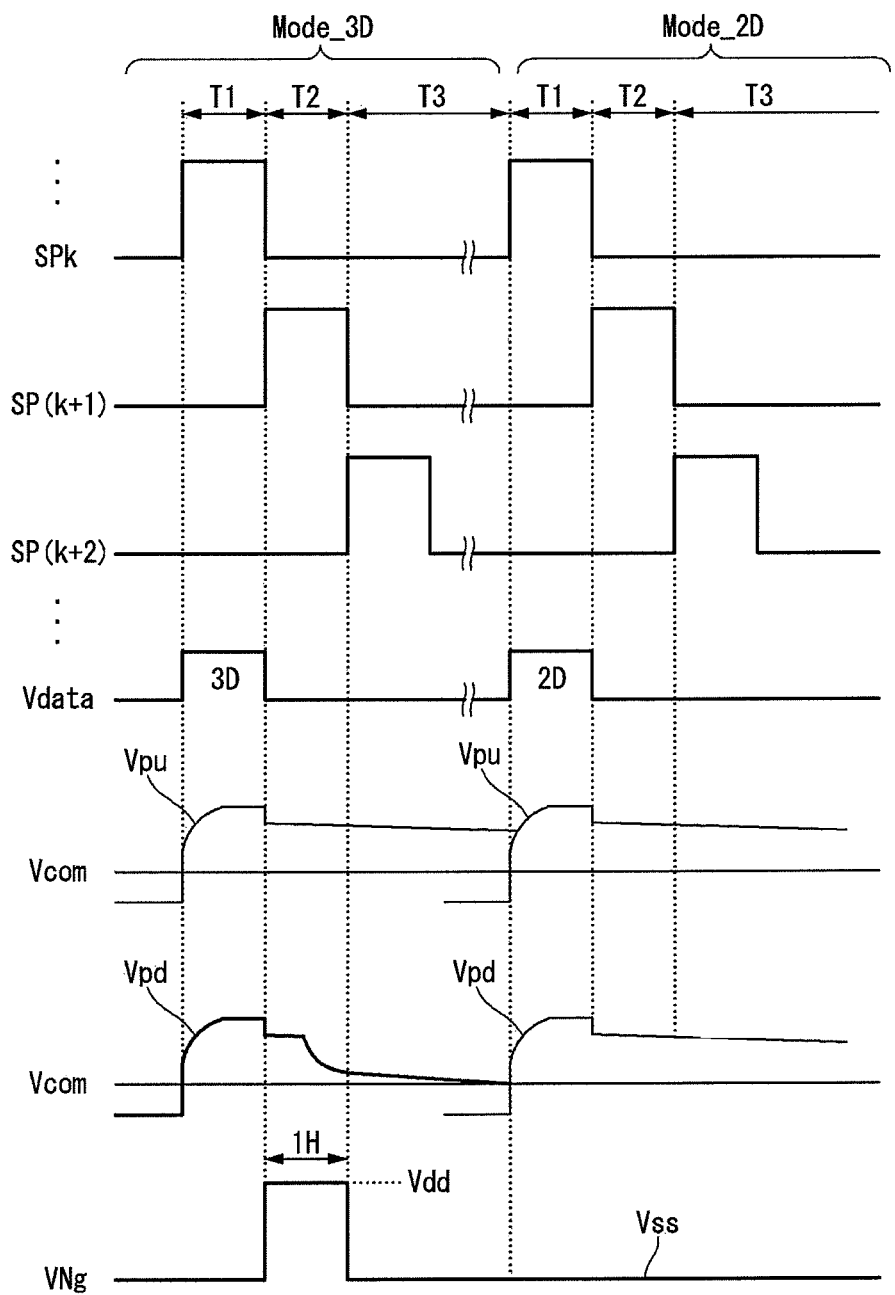
FIG. 12 illustrates a waveform of signals for operating the subpixels shown in FIGS. 10 and 11 and a charging waveform of the subpixels.

Further, as shown in FIG. 12, the controller 12 may equally or differently generate the voltage applied to a first control line VL1 and a second control line VL2 based on the 2D/3D mode. For example, the controller 12 may generate the voltage of a first level Vdd to be applied to the first control line VL1 and the voltage of a second level Vss less than the first level Vdd to be applied to the second control line VL2 in the 3D mode Mode_3D. The controller 12 may generate the voltage of the second level Vss to be applied to the first and second control lines VL1 and VL2 in the 2D mode Mode_2D.

In the 3D mode Mode_3D, the controller 12 separates the RGB digital video data of 3D data format input from a video source into left eye RGB data (hereinafter, referred to as "left eye data") of 3D data format and right eye RGB data (hereinafter, referred to as "right eye data") of 3D data format in conformity with a resolution of the liquid crystal display panel 10. The controller 12 then alternately supplies the left eye data corresponding to one horizontal line and the right eye data corresponding to one horizontal line to the data driving circuit. The data separation operation may be performed by an external system board. In the 2D mode Mode_2D, the controller 12 arranges the RGB digital video data of 2D data format input from the video source in conformity with the resolution of the liquid crystal display panel 10 and supplies the arranged RGB digital video data of 2D data format to the data driving circuit.

The controller 12 generates timing control signals for controlling an operation timing of the panel driving circuit 14 using timing signals such as a vertical sync signal, a horizontal sync signal, a dot clock, and a data enable received from a system board. The controller 12 may multiply the timing control signals by N and may control an operation of the panel driving circuit 14 at a frame frequency of (N×f) Hz, where N is a positive integer equal to or greater than 2, and F is an input frame frequency.

The backlight unit 17 includes a plurality of light sources and a plurality of optical members that convert light from the light sources into light from surface light sources and irradiate the light from the surface light sources to the liquid crystal display panel 10. The light sources may be implemented as one or two or more of a hot cathode fluorescent lamp (HCFL), a cold cathode fluorescent lamp (CCFL), an external electrode fluorescent lamp (EEFL), and a light emitting diode (LED). The optical members include a light guide plate (or a diffusion plate), a prism sheet, a diffusion sheet, and the like, and increase surface uniformity of light from the light sources.

The patterned retarder 18 may be patterned on one of a glass substrate, a transparent plastic substrate, and a film. The substrate, etc. with the patterned retarder 18 formed thereon is attached to the upper polarizing film 16a using an adhesive. The patterned retarder 18 includes first and second retarders, whose light absorption axes are perpendicular to each other, and divides the 3D image into polarization components. The first retarder is formed on odd-numbered lines of the patterned retarder 18 and transmits a first polarization (for example, circular polarization or linear polarization) component of light incident through the upper polarizing film 16a. The second retarder is formed on even-numbered lines of the patterned retarder 18 and transmits a second polarization (for example, circular polarization or linear polarization) component of light incident through the upper polarizing film 16a. For example, the first retarder may be implemented as a polarization filter transmitting left circularly polarized light, and the second retarder may be implemented as a polarization filter transmitting right circularly polarized light.

The polarization glasses 20 are implemented so that its light absorption axis differs depending on the polarization components output from the patterned retarder 18. For example, a left eyeglass of the polarization glasses 20 transmits the left circularly polarized light incident from the first retarder of the patterned retarder 18 and blocks light of other polarization components, and a right eyeglass of the polarization glasses 20 transmits the right circularly polarized light incident from the second retarder of the patterned retarder 18 and blocks light of other polarization components. In this case, the left eyeglass of the polarization glasses 20 may include a left circular polarization filter, and the right eyeglass of the polarization glasses 20 may include a right circular polarization filter.

FIGS. 7 to 15 illustrate a connection structure and an operation effect of subpixels. In FIGS. 7 to 10, the subpixel corresponds to each of the R subpixel, the G subpixel, and the B subpixel.

Figure 7:
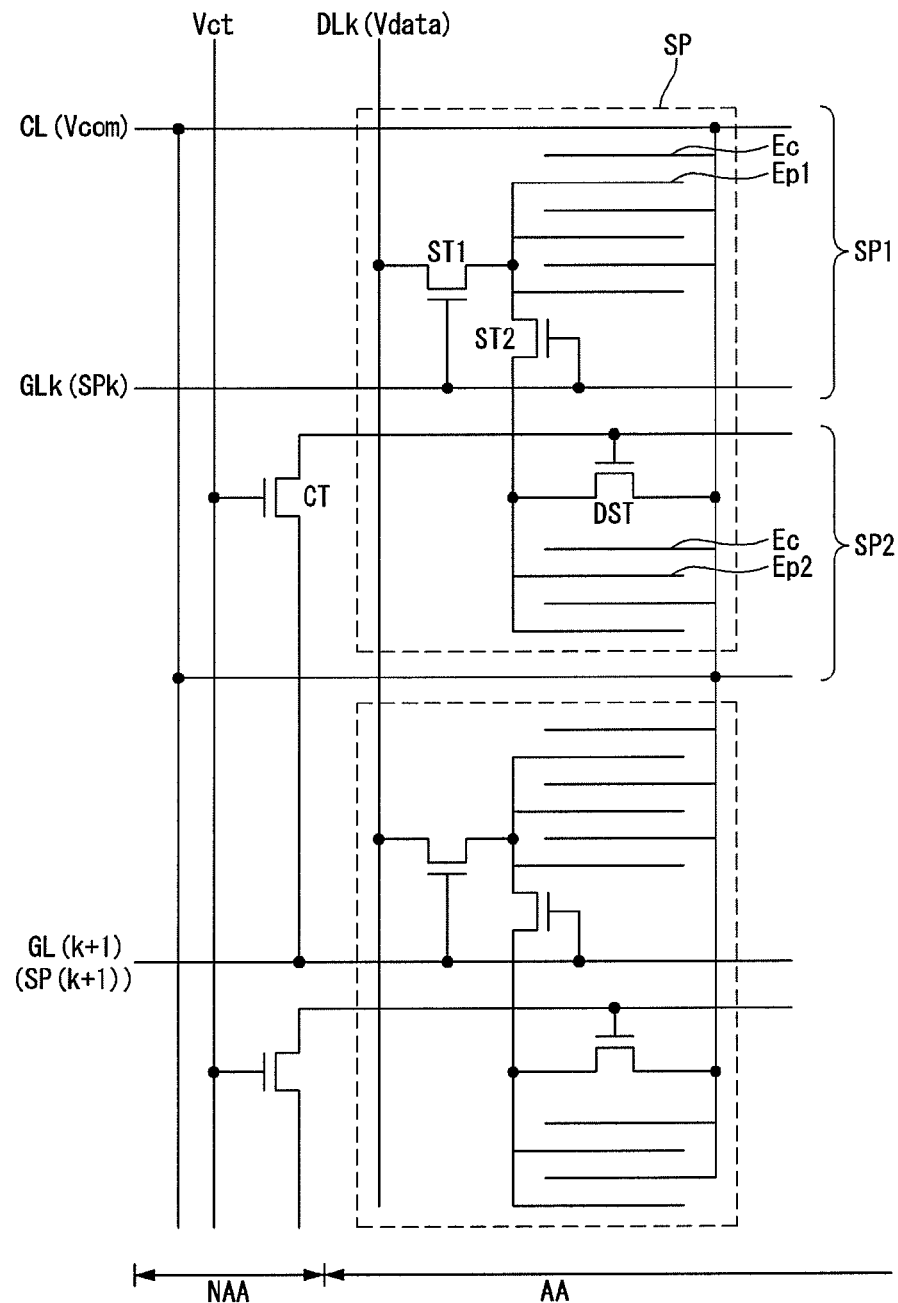
FIG. 7 illustrates a first exemplary connection structure of subpixels.
Figure 8:
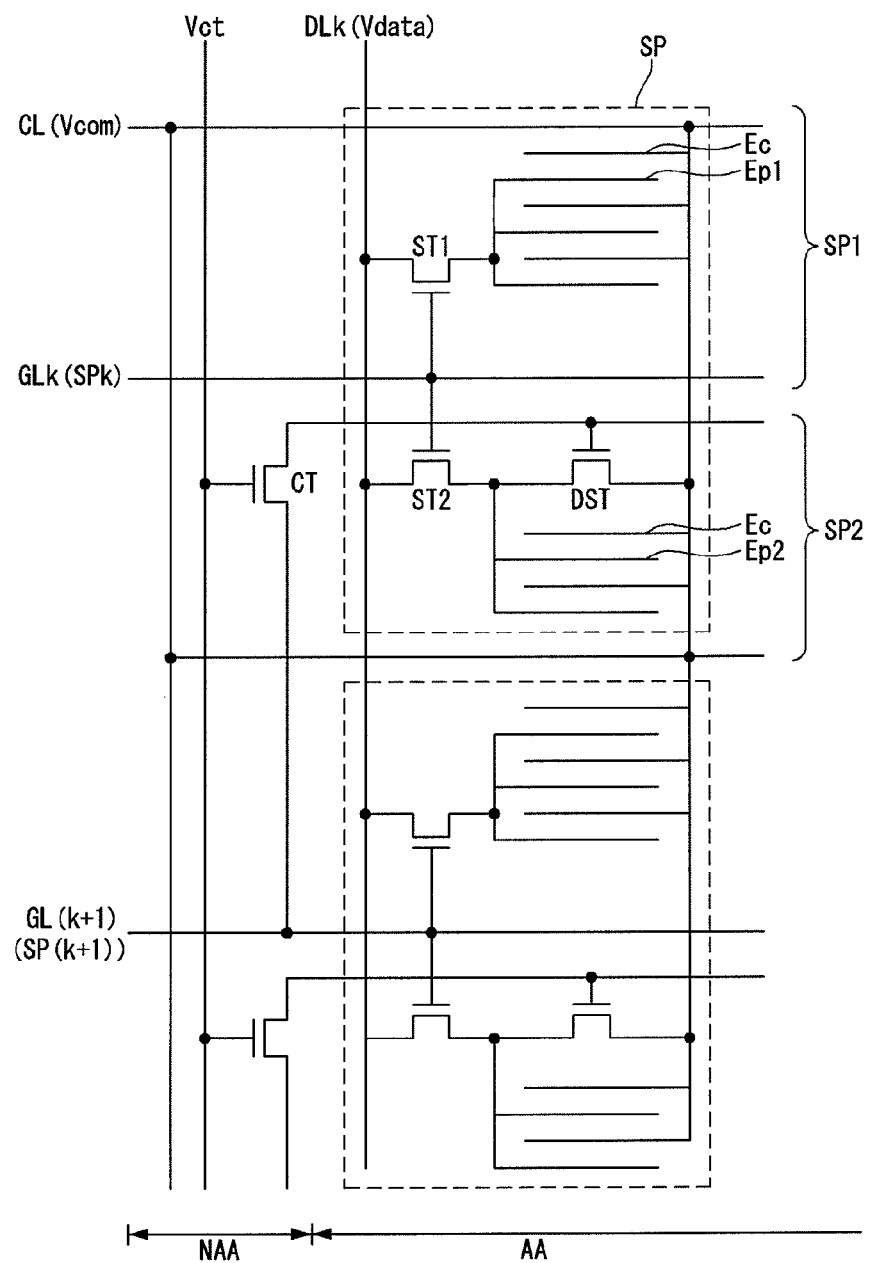
FIG. 8 illustrates a second exemplary connection structure of subpixels.

As shown in FIGS. 7 and 8, a subpixel SP includes a main subpixel SP1 and a subsidiary subpixel SP2 positioned on opposite sides of a k-th gate line GLk, where k is a positive integer.

As shown in FIG. 7, the main subpixel SP1 includes a first pixel electrode Epi1 and a common electrode Ec that are positioned opposite each other. The first pixel electrode Ep1 is selectively connected to a k-th data line DLk through a first TFT ST1. The first TFT ST1 is turned on in response to a k-th scan pulse SPk and thus supplies a data voltage Vdata on the k-th data line DLk to the first pixel electrode Ep1. For this, a gate electrode of the first TFT ST1 is connected to the k-th gate line GLk, a source electrode of the first TFT ST1 is connected to the k-th data line DLk, and a drain electrode of the first TFT ST1 is connected to the first pixel electrode Ep1. The common electrode Ec is connected to a common line CL charged to a common voltage Vcom.

The subsidiary subpixel SP2 includes a second pixel electrode Ep2 and a common electrode Ec that are positioned opposite each other, and a discharge TFT DST selectively connecting the second pixel electrode Ep2 to the common electrode Ec based on a driving mode (i.e. the 2D/3D mode). The second pixel electrode Ep2 is selectively connected to the first pixel electrode Epi1 through a second TFT ST2. The second TFT ST2 is turned on in response to the k-th scan pulse SPk and thus supplies the data voltage Vdata on the first pixel electrode Ep1 to the second pixel electrode Ep2. For this, a gate electrode of the second TFT ST2 is connected to the k-th gate line GLk, a source electrode of the second TFT ST2 is connected to the first pixel electrode Ep1, and a drain electrode of the second TFT ST2 is connected to the second pixel electrode Ep2. The discharge TFT DST is turned on in response to a (k+1)th scan pulse SP(k+1) applied through the control TFT CT and thus discharges the data voltage Vdata of the second pixel electrode Ep2 to a level of the common voltage Vcom. For this, a gate electrode of the discharge TFT DST is connected to a (k+1)th gate line GL(k+1) through the control TFT CT, a source electrode of the discharge TFT DST is connected to the second pixel electrode Ep2, and a drain of the discharge TFT DST is connected to the common electrode Ec.

A switching operation of the control TFT CT for switching a current path between the (k+1)th gate line GL(k+1) and the gate electrode of the discharge TFT DST is controlled based on the control voltage Vct received from the controller 12. The control TFT CT may be positioned in a non-display region NAA of the liquid crystal display panel 10 on which the image is not displayed. In FIG. 7, "AA" indicates a display region AA of the liquid crystal display panel 10 that includes the subpixels and displays the image.

The connection structure of the second TFT ST2 of FIG. 8 is different from FIG. 7. As shown in FIG. 8, the second pixel electrode Ep2 is connected to the k-th data line DLk through the second TFT ST2. The second TFT ST2 ST1 is turned on in response to the k-th scan pulse SPk and thus supplies the data voltage Vdata on the k-th data line DLk to the second pixel electrode Ep2. For this, the gate electrode of the second TFT ST2 is connected to the k-th gate line GLk, the source electrode of the second TFT ST2 is connected to the k-th data line DLk, and the drain electrode of the second TFT ST2 is connected to the second pixel electrode Ep2.

The operation and the effect of the subpixel SP are described below depending on the driving mode (in the 2D/3D mode) based on the connection structure illustrated in FIGS. 7 and 8 and a signal waveform and a charging waveform illustrated in FIG. 9.

In the 3D mode Mode__3D, the control TFT CT is continuously held in a turn-on state in response to the control voltage Vct of a first level L1.

During a period T1 in which the k-th scan pulse SPk is input, the first and second TFTs ST1 and ST2 are turned on. Hence, the same data voltage Vdata is applied to the first pixel electrode Ep1 of the main subpixel SP1 and the second pixel electrode Ep2 of the subsidiary subpixel SP2. During the period T1, because the discharge TFT DST is held in a turn-off state, the main subpixel SP1 is charged to a first pixel voltage Vpu corresponding to a voltage difference (i.e., Vdata−Vcom or Vcom−Vdata) between the first pixel electrode Epi1 and the common electrode Ec, and the subsidiary subpixel SP2 is charged to a second pixel voltage Vpd corresponding to a voltage difference (i.e., Vdata−Vcom or Vcom−Vdata) between the second pixel electrode Ep2 and the common electrode Ec. In this case, the first pixel voltage Vpu and the second pixel voltage Vpd have the same level.

During a period T2 in which the (k+1)th scan pulse SP(k+1) is input, the first and second TFTs ST1 and ST2 are turned off and the discharge TFT DST is turned on. Hence, the first pixel voltage Vpu of the main subpixel SP1 is held at a charging level, and the second pixel voltage Vpd of the subsidiary subpixel SP2 is discharged to the level of the common voltage Vcom.

Figure 14A:
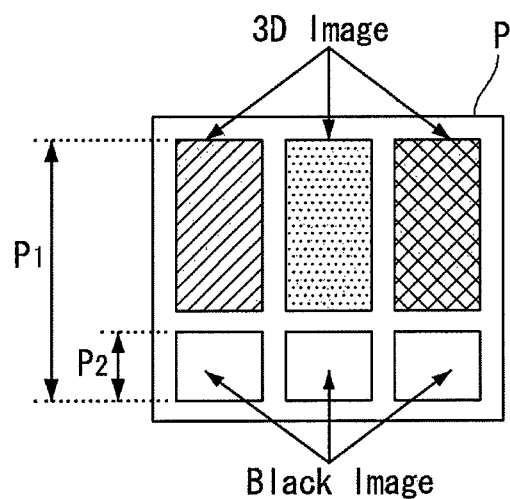
FIG. 14A illustrates an image displayed on the unit pixel in a 3D mode.

During a period T3 following the period T2 in a corresponding frame, the main subpixel SP1 continuously holds the first pixel voltage Vpu at the charging level. Hence, as shown in FIG. 14A, a 3D image is displayed on the main subpixel SP1. The subsidiary subpixel SP2 continuously holds the second pixel voltage Vpd at the discharge level of the common voltage Vcom. Hence, as shown in FIG. 14A, a back image is displayed on the subsidiary subpixel SP2. In the 3D mode Mode __3D, the back image increases a display interval between the 3D images adjacent to one another in a vertical direction. Hence, the exemplary embodiment of the invention can widely secure a 3D upward or downward viewing angle through the black image without a separate black stripe pattern and thus can greatly improve 3D visibility compared with the related art.

On the other hand, in the 2D mode Mode__2D, the control TFT CT is continuously held in a turn-off state in response to the control voltage Vct of a second level L2. Hence, the discharge TFT DST is continuously held in a turn-off state.

During the period T1 in which the k-th scan pulse SPk is input, the same data voltage Vdata is applied to the first pixel electrode Ep1 of the main subpixel SP1 and the second pixel electrode Ep2 of the subsidiary subpixel SP2 because of turn-on operations of the first and second TFTs ST1 and ST2. During the period T1, the main subpixel SP1 is charged to the first pixel voltage Vpu corresponding to the voltage difference (i.e., Vdata−Vcom or Vcom−Vdata) between the first pixel electrode Ep1 and the common electrode Ec, and the subsidiary subpixel SP2 is charged to the second pixel voltage Vpd corresponding to the voltage difference (i.e., Vdata−Vcom or Vcom−Vdata) between the second pixel electrode Ep2 and the common electrode Ec. In this case, the first pixel voltage Vpu and the second pixel voltage Vpd have the same level.

Figure 14B:
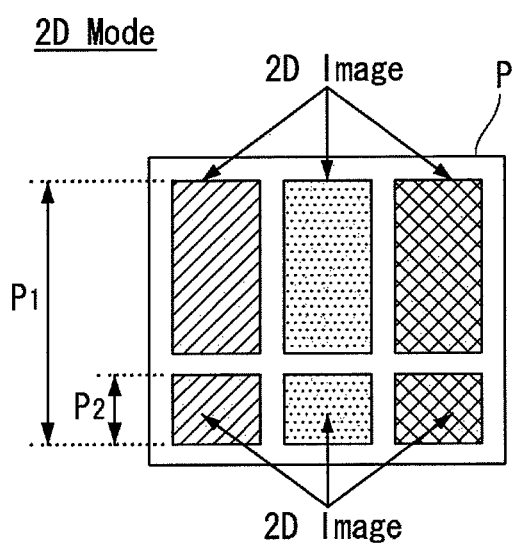
FIG. 14B illustrates an image displayed on the unit pixel in a 2D mode.

During the period T2, in which the (k+1)th scan pulse SP(k+1) is input, and the period T3 following the period T2 in the corresponding frame, the main subpixel SP1 continuously holds the first pixel voltage Vpu at the charging level because of a turn-off operation of the first TFT ST1. Hence, as shown in FIG. 14B, a 2D image is displayed on the main subpixel SP1. Further, the subsidiary subpixel SP2 continuously holds the second pixel voltage. Vpd at the charging level because of a turn-off operation of the second TFT ST2. Hence, as shown in FIG. 14B, the same 2D image as the main subpixel SP1 is displayed on the subsidiary subpixel SP2. In the 2D mode Mode__2D, the 2D image displayed on the subsidiary subpixel SP2 increases a luminance of the 2D image. Hence, the exemplary embodiment of the invention can prevent the luminance reduction and moiré when the 2D image is displayed and thus can greatly improve 2D visibility.

Because the control TFT CT shown in FIGS. 7 and 8 is continuously turned on in the 3D mode Mode__3D, the control TFT CT may be easily deteriorated because of a gate bias stress. To compensate for this, the control TFT CT shown in FIGS. 7 and 8 may be replaced by a mux switch circuit MST shown in FIGS. 10 and 11. Since the subpixel structure shown in FIGS. 10 and 11 is substantially the same as the subpixel structure shown in FIGS. 7 and 8, a further description may be briefly made or may be entirely omitted.

Figure 10:
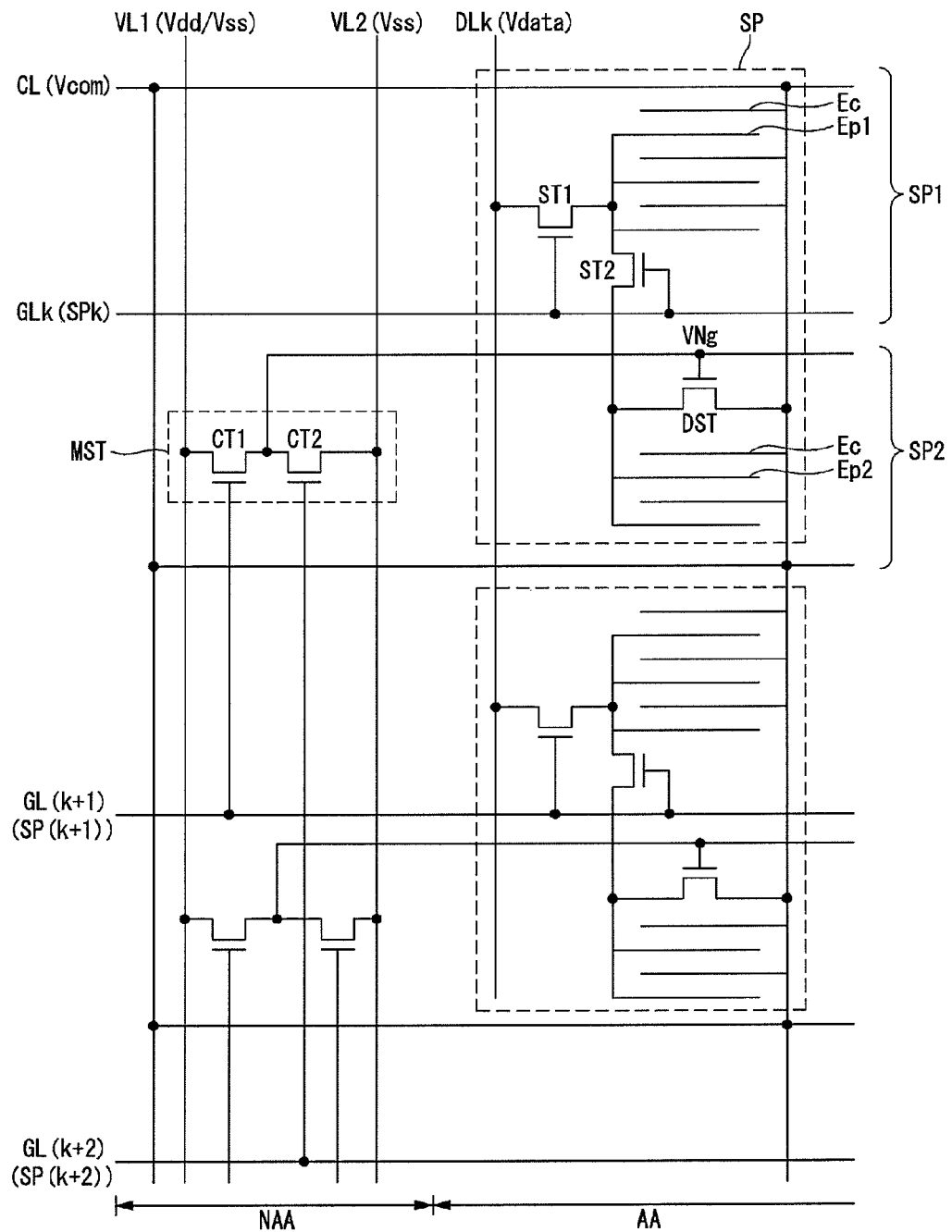
FIG. 10 illustrates a third exemplary connection structure of subpixels.
Figure 11:
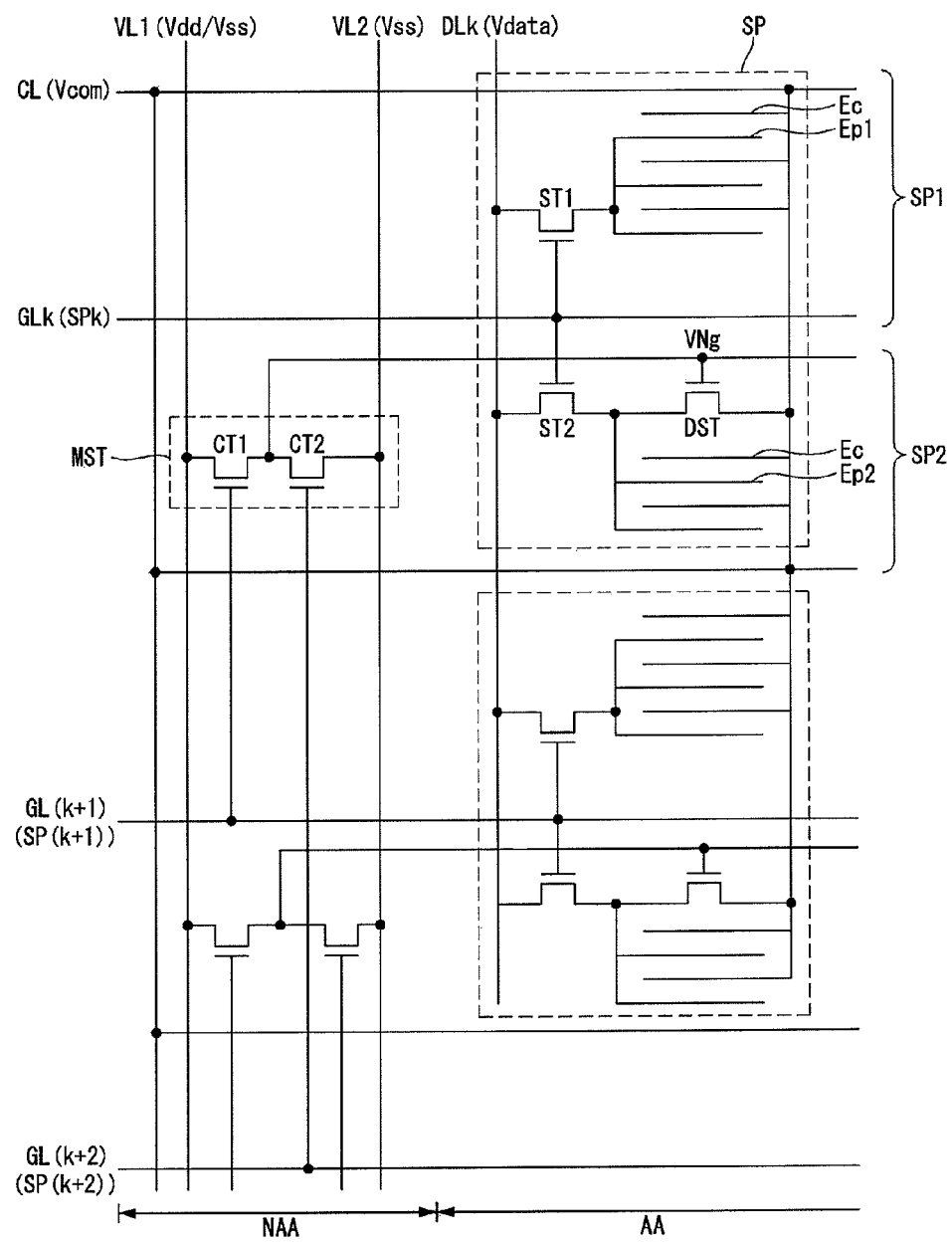
FIG. 11 illustrates a fourth exemplary connection structure of subpixels.

As shown in FIGS. 10 and 11, the mux switch circuit MST switches a current path between the first control line VL1 and the gate electrode of the discharge TFT DST in response to the (k+1)th scan pulse SP(k+1) to apply the voltage on the first control line VL1 to the gate electrode of the discharge TFT DST. Further, the mux switch circuit MST switches a current path between the second control line VL2 and the gate electrode of the discharge TFT DST in response to one of scan pulses subsequent to a (k+2)th scan pulse to apply the voltage on the second control line VL2 to the gate electrode of the discharge TFT DST.

The mux switch circuit MST includes a first control TFT CT1 and a second control TFT CT2. A gate electrode of the first control TFT CT1 is connected to the (k+1)th gate line GL(k+1), a source electrode of the first control TFT CT1 is connected to the first control line VL1, and a drain electrode of the first control TFT CT1 is connected to the gate electrode of the discharge TFT DST. A gate electrode of the second control TFT CT2 is connected to a (k+2)th gate line GL(k+2), a source electrode of the second control TFT CT2 is connected to the second control line VL2, and a drain electrode of the second control TFT CT2 is connected to the gate electrode of the discharge TFT DST. The first and second control lines VL1 and VL2 and the mux switch circuit MST may be formed in a non-display region NAA of the liquid crystal display panel 10 on which the image is not displayed. In FIGS. 10 and 11, "AA" indicates a display region AA of the liquid crystal display panel 10 that includes the subpixels and displays the image.

The operation and the effect of the subpixel SP are described below depending on the driving mode (in the 2D/3D mode) based on the connection structure illustrated in FIGS. 10 and 11 and a signal waveform and a charging waveform illustrated in FIG. 12.

In the 3D mode Mode_3D, the voltage of the first level Vdd is applied to the first control line VL1, and the voltage of the second level Vss is applied to the second control line VL2. The mux switch circuit MST outputs a control voltage VNg of the second level Vss during the periods T1 and T3 and outputs the control voltage VNg of the first level Vdd during the period T2.

During the period T1 in which the k-th scan pulse SPk is input, the first and second TFTs ST1 and ST2 are turned on. Hence, the same data voltage Vdata is applied to the first pixel electrode Epi1 of the main subpixel SP1 and the second pixel electrode Ep2 of the subsidiary subpixel SP2. During the period T1, because the discharge TFT DST is held in a turn-off state in response to the control voltage VNg of the second level Vss, the main subpixel SP1 is charged to the first pixel voltage Vpu corresponding to a voltage difference (i.e., Vdata−Vcom or Vcom−Vdata) between the first pixel electrode Ep1 and the common electrode Ec, and the subsidiary subpixel SP2 is charged to the second pixel voltage Vpd corresponding to a voltage difference (i.e., Vdata−Vcom or Vcom−Vdata) between the second pixel electrode Ep2 and the common electrode Ec. In this instance, the first pixel voltage Vpu and the second pixel voltage Vpd have the same level.

During the period T2 in which the (k+1)th scan pulse SP(k+1) is input, the first and second TFTs ST1 and ST2 are turned off and the discharge TFT DST is turned on in response to the control voltage VNg of the first level Vdd. Hence, the first pixel voltage Vpu of the main subpixel SP1 is held at a charging level, and the second pixel voltage Vpd of the subsidiary subpixel SP2 is discharged to the level of the common voltage Vcom.

During the period T3 following the period T2 in a corresponding frame, the main subpixel SP1 continuously holds the first pixel voltage Vpu at the charging level. Hence, as shown in FIG. 14A, the 3D image is displayed on the main subpixel SP1. The subsidiary subpixel SP2 continuously holds the second pixel voltage Vpd at the discharge level of the common voltage Vcom. Hence, as shown in FIG. 14A, the back image is displayed on the subsidiary subpixel SP2. In the 3D mode Mode_3D, the back image increases a display interval between the 3D images adjacent to one another in a vertical direction. Hence, the exemplary embodiment of the invention can widely secure a 3D upward or downward viewing angle through the black image without a separate black stripe pattern and thus can greatly improve the 3D visibility compared with the related art.

Figure 13:
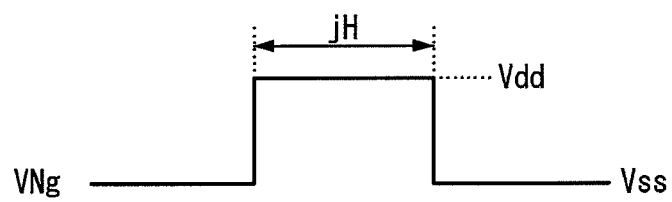
FIG. 13 illustrates an exemplary extension of a turn-on period of a discharge TFT.

During the period T3, the discharge TFT DST is turned off in response to the control voltage VNg of the second level Vss. The duration during which the discharge TFT DST is turned on in response to the control voltage VNg of the first level Vdd may be set to one horizontal period 1H shown FIG. 12. Furthermore, as shown in FIG. 13, the duration during which the discharge TFT DST is turned on in response to the control voltage VNg of the first level Vdd may be set to j horizontal periods jH longer than the one horizontal period 1H, where j is a positive integer greater than 1. The gate electrode of the second control TFT CT2 has to be connected to a (k+1+j)th gate line GL(k+1+j) so as to extend a hold length of the control voltage VNg of the first level Vdd to the j horizontal periods jH.

On the other hand, in the 2D mode Mode_2D, the voltage of the second level Vss is applied to the first and second control lines VL1 and VL2. The mux switch circuit MST continuously outputs the control voltage VNg of the second level Vss during the periods T1 to T3. Hence, the discharge TFT DST is continuously held in the turn-off state.

During the period T1 in which the k-th scan pulse SPk is input, the same data voltage Vdata is applied to the first pixel electrode Ep1 of the main subpixel SP1 and the second pixel electrode Ep2 of the subsidiary subpixel SP2 because of the turn-on operation of the first and second TFTs ST1 and ST2. During the period T1, the main subpixel SP1 is charged to the first pixel voltage Vpu corresponding to the voltage difference (i.e., Vdata−Vcom or Vcom−Vdata) between the first pixel electrode Ep1 and the common electrode Ec, and the subsidiary subpixel SP2 is charged to the second pixel voltage Vpd corresponding to the voltage difference (i.e., Vdata−Vcom or Vcom−Vdata) between the second pixel electrode Ep2 and the common electrode Ec. In this instance, the first pixel voltage Vpu and the second pixel voltage Vpd have the same level.

During the period T2, in which the (k+1)th scan pulse SP(k+1) is input, and the period T3 following the period T2 in the corresponding frame, the main subpixel SP1 continuously holds the first pixel voltage Vpu at the charging level because of the turn-off operation of the first and second TFTs ST1 and ST2. Hence, as shown in FIG. 14B, the 2D image is displayed on the main subpixel SP1. Further, the subsidiary subpixel SP2 continuously holds the second pixel voltage Vpd at the charging level because of the turn-off operation of the first and second TFTs ST1 and ST2. Hence, as shown in FIG. 14B, the same 2D image as the main subpixel SP1 is displayed on the subsidiary subpixel SP2. In the 2D mode Mode_2D, the 2D image displayed on the subsidiary subpixel SP2 increases a luminance of the 2D image. Hence, the exemplary embodiment of the invention can prevent the luminance reduction and moiré when the 2D image is displayed and thus can greatly improve 2D visibility.

Figure 15:
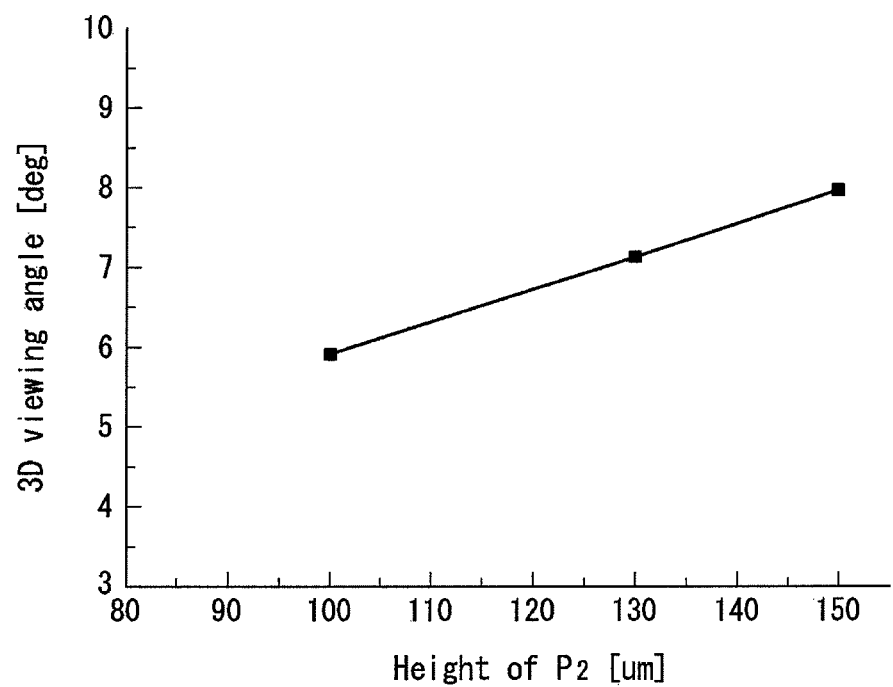
FIG. 15 is a graph illustrating a relationship between a vertical pitch of a subsidiary subpixel and a 3D viewing angle.

As shown in FIG. 15, a vertical pitch P2 of the subsidiary subpixel SP2 has a close relation with the 3D upward/downward viewing angle. In other words, the 3D upward/downward viewing angle increases as a percentage (P2*100)/P1 of the vertical pitch P2 of the subsidiary subpixel SP2 based on a vertical pitch P1 of the subpixel SP increases, and decreases as the percentage (P2*100)/P1 decreases. On the other hand, the luminance of the 3D image decreases as the percentage (P2*100)/P1 increases, and increases as the percentage (P2*100)/P1 decreases. According to an experiment, when a ratio of the vertical pitch P2 of the subsidiary subpixel SP2 to a vertical pitch of the main subpixel SP1 is 1:2, the 3D upward/downward viewing angle and the luminance of the 3D image may be close to a satisfactory level. However, because the ratio may vary depending on 3D characteristics, the vertical pitch P2 of the subsidiary subpixel SP2 may be designed to have a suitable size in consideration of a relationship between the 3D upward/downward viewing angle and the luminance of the 3D image.

Figure 16:
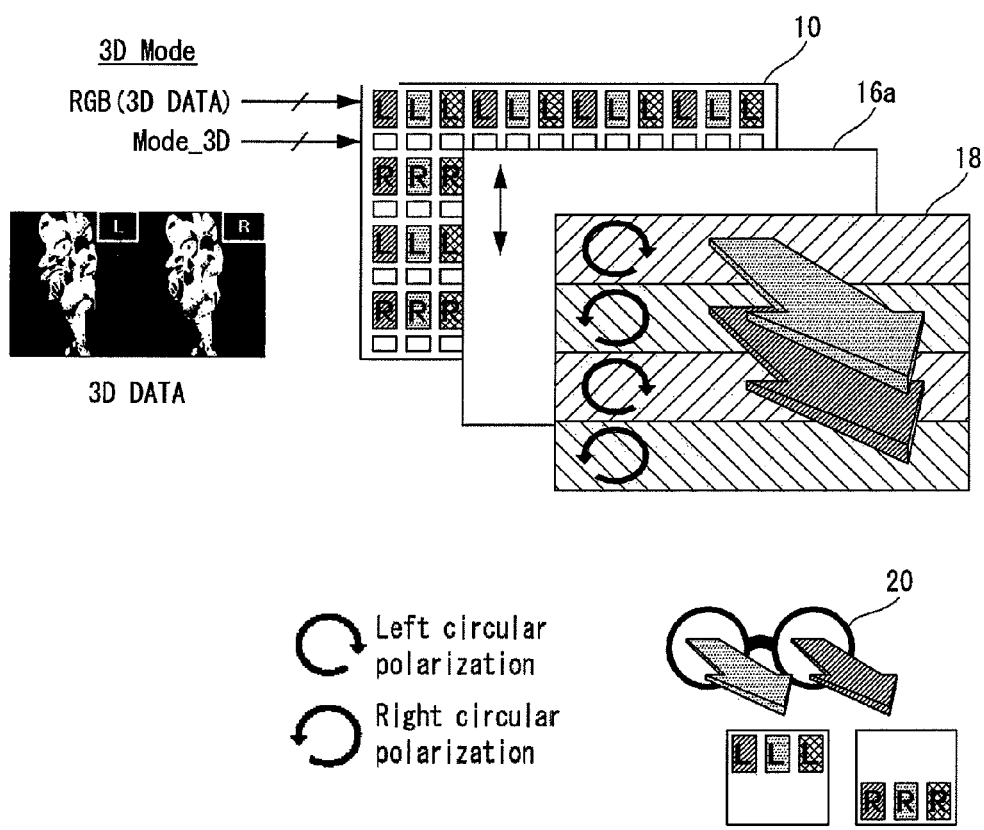
FIG. 16 schematically illustrates an operation of the image display device in a 3D mode.

FIG. 16 schematically illustrates an operation of the image display device in the 3D mode.

As shown in FIG. 16, in the 3D mode (Mode_3D), a left eye RGB image L is displayed on the main subpixels positioned on the odd-numbered horizontal lines of the liquid crystal display panel 10, and a right eye RGB image R is displayed on the main subpixels positioned on the even-numbered horizontal lines of the liquid crystal display panel 10. The left eye RGB image L and the right eye RGB image R are divided into polarization components by the first and second retarders of the patterned retarder 18 alternatively formed on horizontal lines of the patterned retarder 18. The left eye RGB image L transmitted by the first retarder is transmitted to the left eyeglass of the polarization glasses 20, and the right eye RGB image R transmitted by the second retarder is transmitted to the right eyeglass of the polarization glasses 20. Hence, the 3D image is implemented.

In the 3D mode (Mode_3D), the black image is displayed on the subsidiary subpixels of the liquid crystal display panel 10. The back image increases a display interval between the left eye RGB image L and the right eye RGB image R adjacent to one another in a vertical direction.

Figure 17:
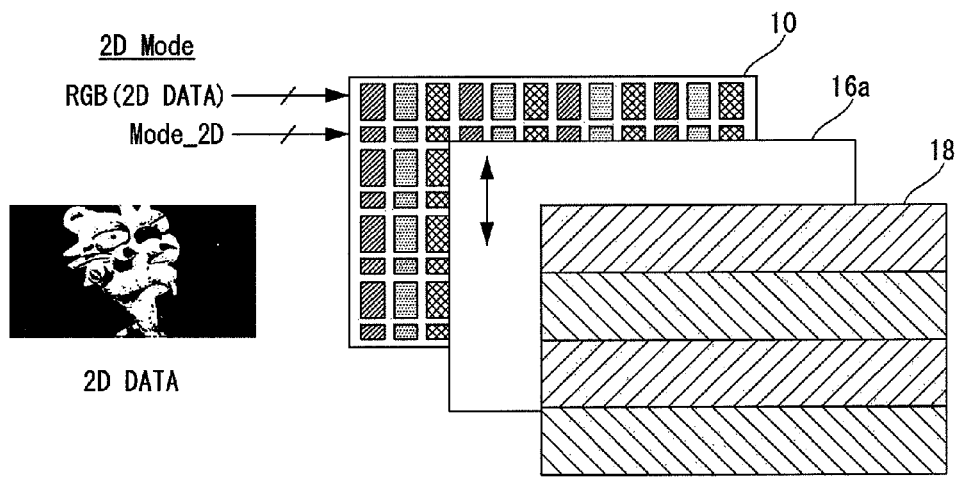
FIG. 17 schematically illustrates an operation of the image display device in a 2D mode.

FIG. 17 schematically illustrates an operation of the image display device in the 2D mode.

As shown in FIG. 17, in the 2D mode Mode_2D, the same RGB image is displayed on the main subpixels and the subsidiary subpixels of the liquid crystal display panel 10. The RGB image displayed on the subsidiary subpixels increases the luminance of the 2D image.

Figure 18:
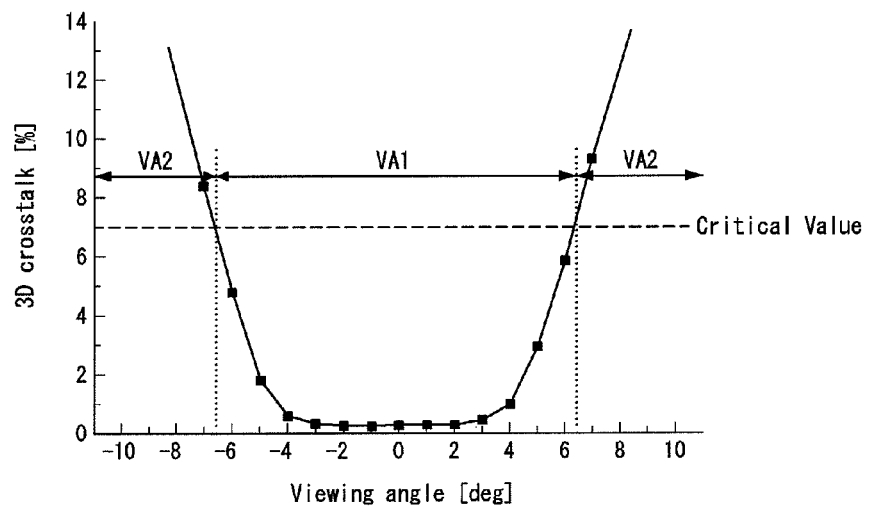
FIG. 18 is a graph illustrating a crosstalk value of a 3D image based on a 3D viewing angle.

FIG. 18 is a graph illustrating a crosstalk value of the 3D image based on the 3D viewing angle. In FIG. 18, a horizontal axis indicates an upward (+)/downward (−) viewing angle (unit: degree) of the 3D image, and a vertical axis indicates a 3D crosstalk value (unit: %).

In the image display device that displays the 3D image using the display panel alternately displaying the left eye image and the right eye image every one horizontal line and the patterned retarder that is spaced positioned apart from the display panel at a predetermined distance and changes the polarization characteristics every one horizontal line, as mentioned above, the 3D image with good image quality may be implemented by transmitting only the left eye image using the left eye retarder and transmitting only the right eye image using the right eye retarder. However, when observing the image display device not at the front side but at a location of the upward/downward viewing angle, the left eye image may pass through the right eye retarder as well as the left eye retarder and the right eye image may pass through the left eye retarder as well as the right eye retarder. Hence, a 3D crosstalk C/T is generated. The generated 3D crosstalk C/T may be represented by flowing Equation 1:

$$C/T[\%] = \frac{L_{Black}R_{White} - Black}{L_{White}R_{Black} - Black} \times 100 \quad \text{[Equation 1]}$$

In Equation 1, '$L_{Black}R_{White}$' is a luminance value of a pattern displaying a black image on the left eye pixels and a white image on the right eye pixels, '$L_{White}R_{Black}$' is a luminance value of a pattern displaying the white image on the left eye pixels and the black image on the right eye pixels, and 'Black' is a luminance value measured after the black image is displayed on all the pixels. In general, a viewing angle obtained when the 3D crosstalk value C/T calculated through Equation 1 is equal to or less than 7% is defined as the 3D viewing angle at which the 3D image with the good image quality can be obtained. As a result, the 3D crosstalk value C/T of 7% is a critical value for determining the 3D viewing angle capable of obtaining the good 3D image. However, the critical value (7%) may vary depending on models of the image display device.

As noted in the graph of FIG. 18, the user may view a 3D image of the good image quality within a viewing angle range VA1 in which the 3D crosstalk value (unit: %) is equal to or less than a predetermined critical value (e.g., 7%). On the other hand, the user may not view the 3D image of the good image quality within a viewing angle range VA2 in which the 3D crosstalk value (unit: %) is greater than the predetermined critical value (e.g., 7%) because of an overlap of the left and right eye images.

Figure 19:
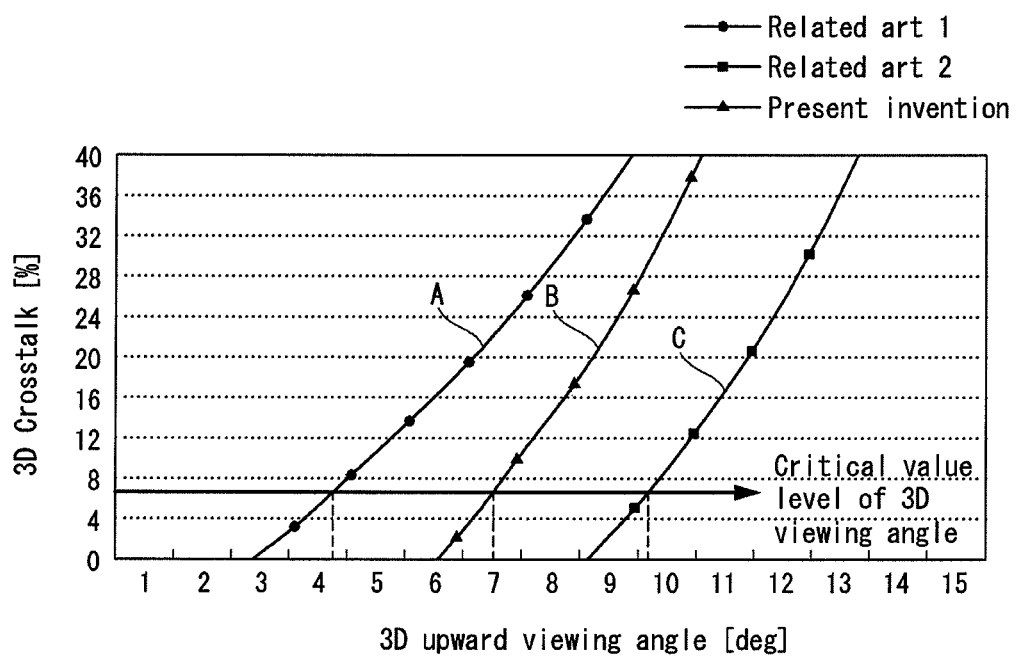
FIG. 19 is a graph illustrating a comparison between an upward viewing angle of a 3D image according to an exemplary embodiment of the invention and an upward viewing angle of a 3D image in the related arts.

FIG. 19 is a graph illustrating a comparison between an upward viewing angle of a 3D image according to the exemplary embodiment of the invention and an upward viewing angle of a 3D image in the related arts. In FIG. 19, a horizontal axis indicates the upward viewing angle (unit: degree) of the 3D image, and a vertical axis indicates a crosstalk value (unit: %) of the 3D image.

In FIG. 19, a graph 'A' indicates an upward viewing angle of the related art 1 in which left and right eye images have a display interval of 80 μm by black matrixes and a patterned retarder does not have black stripes. According to the graph 'A', in the related art 1, the upward viewing angle satisfying the critical value (e.g., 7%) of the 3D crosstalk is approximately 0° to 4° and is very narrow. A graph 'C' indicates an upward viewing angle of the related art 2 in which left and right eye images have a display interval of 80 μm by black matrixes and a patterned retarder have black stripe patterns with a width of 210 μm. According to the graph 'C', in the related art 2, the upward viewing angle satisfying the critical value (e.g., 7%) of the 3D crosstalk is approximately 0° to 10° and is relatively wide. However, the related art 2 has the side effects that the visibility and the luminance of the 2D image are degraded due to the presence of the black stripe patterns for securing the viewing angle.

On the contrary, when the 3D image is displayed, the exemplary embodiment of the invention can sufficiently secure the display interval between the left and right eye images without a separate black stripe pattern. Thus, as indicated by a graph 'B' in FIG. 19, the upward viewing angle satisfying the critical value (e.g., 7%) of the 3D crosstalk may increase to approximately 0° to 7° without reducing the visibility and the luminance of the 2D image.

As described above, the image display device according to the exemplary embodiment of the invention can improve the visibility of both the 2D and 3D images and prevent the luminance reduction, in particular, in displaying the 2D image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
   a display panel including a plurality of red, green, and blue subpixels, the display panel configured to selectively display a 2D image and a 3D image; and a patterned retarder positioned in front of the display panel, the patterned retarder configured to divide light from the display panel into light of a first polarization and light of a second polarization when the 3D image is displayed, wherein each of the plurality of red, green, and blue subpixels includes:

a main subpixel including a first pixel electrode receiving a data voltage through a data line and a common electrode that is positioned opposite the first pixel electrode and receives a common voltage through a common line; and a subsidiary subpixel including a second pixel electrode receiving the data voltage through the data line, a common electrode positioned opposite the second pixel electrode, and a discharge thin film transistor (TFT) selectively connecting the second pixel electrode to the common electrode to discharge the data voltage of the second pixel electrode to a common voltage of the common electrode based on a displayed image.

2. The image display device of claim 1, wherein the discharge TFT is turned on when the 3D image is displayed, and electrically connects the second pixel electrode to the common electrode, wherein the discharge TFT is turned off when the 2D image is displayed, and provides an electrical disconnect between the second pixel electrode and the common electrode.

3. The image display device of claim 2, wherein the first pixel electrode is selectively connected to the data line through a first TFT, and the second pixel electrode is selectively connected to the first pixel electrode through a second TFT.

4. The image display device of claim 3, wherein the main subpixel and the subsidiary subpixel are positioned on opposite sides of a k-th gate line, where k is a positive integer, wherein the first and second TFTs are turned on in response to a k-th scan pulse applied to the k-th gate line, wherein the discharge TFT is turned on in response to a (k+1)th scan pulse applied to a (k+1)th gate line adjacent to the k-th gate line.

5. The image display device of claim 4, further comprising a control TFT configured to selectively connect a gate electrode of the discharge TFT to the (k+1)th gate line, wherein the control TFT is positioned in a non-display region of the display panel on which an image is not displayed and is continuously turned on when the 3D image is displayed and is continuously turned off when the 2D image is displayed.

6. The image display device of claim 3, wherein the main subpixel and the subsidiary subpixel are positioned on opposite sides of a k-th gate line, where k is a positive integer, wherein the first and second TFTs are turned on in response to a k-th scan pulse applied to the k-th gate line, wherein the discharge TFT is turned on in response to a control voltage of a first level applied to a first control line and is turned off in response to a control voltage of a second level applied to a second control line.

7. The image display device of claim 6, wherein when the 3D image is displayed, the control voltage of the first level is applied to the first control line and the control voltage of the second level is applied to the second control line, wherein when the 2D image is displayed, the control voltage of the second level is applied to the first and second control lines.

8. The image display device of claim 7, further comprising a mux switch circuit configured to selectively connect a gate electrode of the discharge TFT to the first and second control lines, wherein the mux switch circuit switches a current path between the first control line and the gate electrode of the discharge TFT in response to a (k+1)th scan pulse and switches a current path between the second control line and the gate electrode of the discharge TFT in response to one of scan pulses subsequent to a (k+2)th scan pulse.

9. The image display device of claim 8, wherein the mux switch circuit includes:

a first control TFT including a gate electrode connected to a (k+1)th gate line receiving the (k+1)th scan pulse, a source electrode connected to the first control line, and a drain electrode connected to the gate electrode of the discharge TFT; and a second control TFT including a gate electrode connected to a gate line receiving the one of the scan pulses subsequent to the (k+2)th scan pulse, a source electrode connected to the second control line, and a drain electrode connected to the gate electrode of the discharge TFT.

10. The image display device of claim 9, wherein the first and second control lines and the mux switch circuit are positioned in a non-display region of the display panel on which the image is not displayed.

11. The image display device of claim 2, wherein the first pixel electrode is selectively connected to the data line through a first TFT, and wherein the second pixel electrode is selectively connected to the data line through a second TFT.

12. The image display device of claim 11, wherein the main subpixel and the subsidiary subpixel are positioned on opposite sides of a k-th gate line, where k is a positive integer, wherein the first and second TFTs are turned on in response to a k-th scan pulse applied to the k-th gate line, wherein the discharge TFT is turned on in response to a (k+1)th scan pulse applied to a (k+1)th gate line adjacent to the k-th gate line.

13. The image display device of claim 12, further comprising a control TFT configured to selectively connect a gate electrode of the discharge TFT to the (k+1)th gate line, wherein the control TFT is positioned in a non-display region of the display panel on which an image is not displayed and is continuously turned on when the 3D image is displayed and is continuously turned off when the 2D image is displayed.

14. The image display device of claim 11, wherein the main subpixel and the subsidiary subpixel are positioned on opposite sides of a k-th gate line, where k is a positive integer, wherein the first and second TFTs are turned on in response to a k-th scan pulse applied to the k-th gate line, wherein the discharge TFT is turned on in response to a control voltage of a first level applied to a first control line and is turned off in response to a control voltage of a second level applied to a second control line.

15. The image display device of claim 14, wherein when the 3D image is displayed, the control voltage of the first level is applied to the first control line and the control voltage of the second level is applied to the second control line, wherein when the 2D image is displayed, the control voltage of the second level is applied to the first and second control lines.

16. The image display device of claim 15, further comprising a mux switch circuit configured to selectively connect a gate electrode of the discharge TFT to the first and second control lines, wherein the mux switch circuit switches a current path between the first control line and the gate electrode of the discharge TFT in response to a (k+1)th scan pulse and switches a current path between the second control line and the gate electrode of the discharge TFT in response to one of scan pulses subsequent to a (k+2)th scan pulse.

17. The image display device of claim 16, wherein the mux switch circuit includes:
   a first control TFT including a gate electrode connected to a (k+1)th gate line receiving the (k+1)th scan pulse, a source electrode connected to the first control line, and a drain electrode connected to the gate electrode of the discharge TFT; and
   a second control TFT including a gate electrode connected to a gate line receiving the one of the scan pulses subsequent to the (k+2)th scan pulse, a source electrode connected to the second control line, and a drain electrode connected to the gate electrode of the discharge TFT.

18. The image display device of claim 17, wherein the first and second control lines and the mux switch circuit are positioned in a non-display region of the display panel on which the image is not displayed.

19. The image display device of claim 1, wherein a percentage of a vertical pitch of the subsidiary subpixel based on a total vertical pitch of each subpixel is determined based on a viewing angle and a luminance of the 3D image.

20. The image display device of claim 19, wherein a ratio of the vertical pitch of the subsidiary subpixel to a vertical pitch of the main subpixel is 1:2.

* * * * *